UNITED STATES PATENT OFFICE.

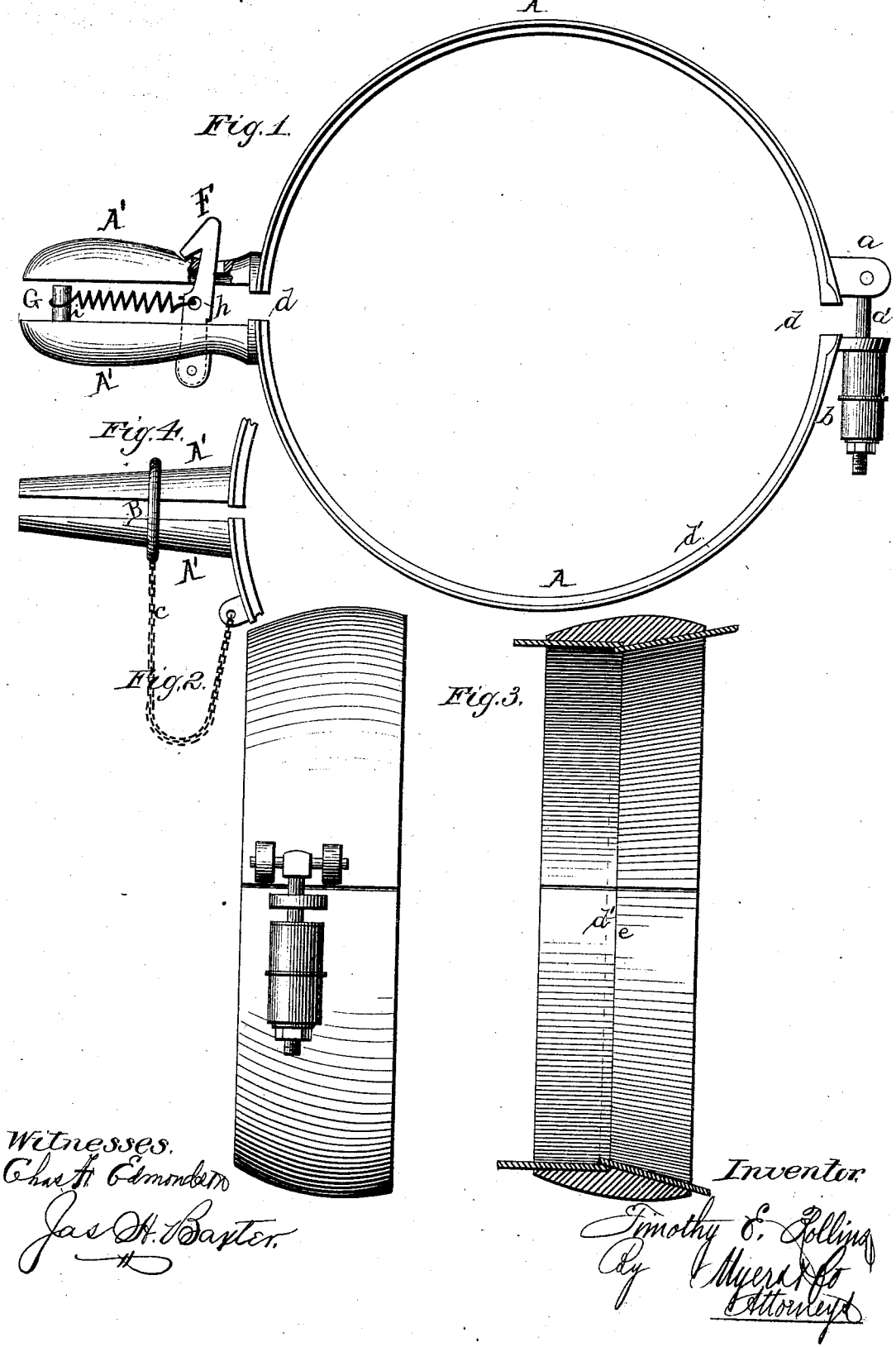

TIMOTHY E. ROLLINS, OF CORNING, NEW YORK.

STOVE-PIPE.

SPECIFICATION forming part of Letters Patent No. 265,873, dated October 10, 1882.

Application filed July 21, 1882. (No model.)

*To all whom it may concern:*

Be it known that I, T. E. ROLLINS, a citizen of the United States of America, residing at Corning, in the county of Steuben and State of New York, have invented certain new and useful Improvements in Stove-Pipes, of which the following is a specification, reference being had therein to the accompanying drawings.

This invention relates to an improvement in stove-pipe-jointing appliances, having for its object to unite sections of pipe, especially stove-pipe sections; and it consists in the employment of semicircular plates connected together preferably by means of an expansible joint, hinge, or coupling, and each semicircular plate is provided with half of a handle for the purpose of forming a whole handle when the two semicircular plates are placed around the pipe and the two half-handles are brought together, said plates being constructed in cross-section, with a recess about half their width, while the remaining portion of their surface is sloped or inclined outward from the shoulder formed by said recess, substantially as hereinafter more fully set forth and claimed.

In the accompanying drawings, Figure 1 is a plan view of my improved stove-pipe-section jointer with a modification of the clamping mechanism, and Figs. 2 and 4 are detail views of the same. Fig. 3 is a sectional view of the same.

In carrying out my invention I employ two semicircular plates or half-rings, A A, connected together by an expansible joint, coupling, or hinge, which in the present instance is constructed as follows:

At one of the ends of the plates or half-rings A is affixed or cast a stud, a. From one of these studs projects a rod or pintle, a', which is passed through an aperture in the other stud. Upon that portion of the rod or pintle a' projected beyond the apertured stud is arranged a compressible rubber spring, b, nutted in place thereon. This arrangement or coupling permits the accommodation of the device to pipe-sections of varying diameters. The other ends of the half rings or plates A are each provided with a half handle or arm, A', said half-handles being preferably held together, when the device is applied for use, by a ring or band, B, which may dangle by a chain, c, from the same when not in use, said chain being connected to one of the plates or ring-sections.

The semicircular sections or plates A are each constructed or cast in cross-section, with a recess, d, extending about half its width, thus providing for the reception of the larger pipe-section, whose inserted end rests against the shoulder d' thus provided. The remaining half of each section or plate A is sloped or inclined from said shoulder outward, as at e, and from this side of the device the other section of pipe is inserted.

It will be seen that with the longer end of one section of pipe inserted into the recess d of the plates A, upon which the latter are clamped by sliding the ring or band B upon their half-handles and toward the plates, and by forcing the end of the other section of pipe up the inclined surface e of said plates and beyond the shoulder d' the desired distance to enter the pipe-section on the opposite side, and then loosening the plates, the two sections of pipes will be brought together, one telescoping the other. The sections of pipe are thus joined or united one upon the other.

A modification of my improvement is shown in Fig. 1, wherein the vertical clutch F is projected through slots in the arm or handle A'. The clutch being held by the spring G, which is projected through and secured thereto at orifice h, the other or opposite end of the spring is suitably secured to the vertical pin i. The spring, acting upon the clutch, draws and securely holds together the arms or handles A' and plates and half-rings A.

I claim and desire to secure by Letters Patent—

In a pipe-joining device, the combination of the semicircular recessed plates or half-rings A, adjustably hinged at a, said plates or half-rings being recessed to a shoulder from one edge and beveled inwardly from the opposite edge, as shown and described, with the clamping half-handles held together by catch F or the ring, as shown and described.

In testimony whereof I affix my signature in presence of two witnesses.

TIMOTHY E. ROLLINS.

Witnesses:
CHAS. H. THOMSON,
THOS. H. THOMSON.